(12) United States Patent
Kim (10) Patent No.: US 12,214,766 B2
(45) Date of Patent: Feb. 4, 2025

(54) VEHICLE COLLISION PREVENTION SYSTEM USING LIGHT SOURCES EMITTING LIGHT RAYS HAVING DIFFERENT ORIENTATIONS FROM ONE ANOTHER

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 654 days.

(21) Appl. No.: 17/467,490

(22) Filed: Sep. 7, 2021

(65) Prior Publication Data
US 2022/0073037 A1    Mar. 10, 2022

(30) Foreign Application Priority Data

Sep. 8, 2020 (KR) .................. 10-2020-0114827

(51) Int. Cl.
*B60T 7/12* (2006.01)
*G06V 10/141* (2022.01)
*G06V 10/145* (2022.01)
*G06V 20/58* (2022.01)

(52) U.S. Cl.
CPC .............. *B60T 7/12* (2013.01); *G06V 10/141* (2022.01); *G06V 10/145* (2022.01); *G06V 20/58* (2022.01); *B60T 2210/32* (2013.01); *B60T 2250/04* (2013.01)

(58) Field of Classification Search
None
See application file for complete search history.

(56) References Cited

U.S. PATENT DOCUMENTS

2012/0191300 A1* 7/2012 Mayo .................... B60Q 1/535
                                                          701/41
2016/0116593 A1* 4/2016 Kim ...................... G01S 17/931
                                                          356/5.01

OTHER PUBLICATIONS

Espacenet translation of Roelke (DE 10 2010 039 092 A1), retrieved May 1, 2024. (Year: 2011).*

* cited by examiner

*Primary Examiner* — James J Lee
*Assistant Examiner* — Jonathan E Reinert
(74) *Attorney, Agent, or Firm* — Novo TechIP International PLLC (57) ABSTRACT

The present disclosure relates to a vehicle collision prevention system and a collision prevention method by using the same, and may include a first light source positioned on a left side of a vehicle, a second light source positioned on a right side of the vehicle, a camera positioned at a center of the vehicle and providing a shape, which is displayed when rays emitted from the first light source and the second light source irradiate an object, as image data, an image processing device that generating braking information based on the image data, and a braking device that performing a braking operation of decreasing a speed of the vehicle or stopping the vehicle based on the braking information.

5 Claims, 11 Drawing Sheets

VEHICLE COLLISION PREVENTION SYSTEM USING LIGHT SOURCES EMITTING LIGHT RAYS HAVING DIFFERENT ORIENTATIONS FROM ONE ANOTHER

CROSS-REFERENCE TO RELATED APPLICATIONS

This application claims the benefit of priority to Korean Patent Application No. 10-2020-0114827, filed in the Korean Intellectual Property Office on Sep. 8, 2020, the entire contents of which are incorporated herein by reference.

BACKGROUND OF THE INVENTION

1. Field of the Invention

The present disclosure relates to a vehicle collision prevention system and a collision prevention method by using the same.

2. Discussion of Related Art

As technologies have been refined, various sensors, electronic devices, and the like are included in a vehicle. In particular, an advanced driver assistance system (ADAS) has been actively researched for a user's driving convenience. Furthermore, autonomous vehicles have been actively developed.

For safe driving and driver convenience, the ADAS and autonomous vehicles have no choice but to be equipped with a lot of sensors and electronic devices.

In detail, to prevent the collision between a vehicle and an object existing around the vehicle, the ADAS and autonomous vehicles include sensors that detect the object at a periphery of the vehicle and a distance to the vehicle.

The sensors that detect the distance between the object and the vehicle are being developed. However, the distance is calculated through a complex structure and a complex algorithm, and thus the complex structures and complex algorithms operate as a cause of cost increase and malfunction.

BRIEF SUMMARY OF THE INVENTION

The present disclosure has been made to solve the above-mentioned problems occurring in the prior art while advantages achieved by the prior art are maintained intact.

An aspect of the present disclosure provides a vehicle collision prevention system capable of determining the possibility of collision by using a pair of light sources, and a collision prevention method using the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle collision prevention system may include a first light source positioned on a left side of a vehicle, a second light source positioned on a right side of the vehicle, a camera positioned at a center of the vehicle and providing a shape, which is displayed when rays emitted from the first light source and the second light source irradiate an object, as image data, an image processing device that generating braking information based on the image data, and a braking device that performing a braking operation of decreasing a speed of the vehicle or stopping the vehicle based on the braking information.

According to an aspect of the present disclosure, a vehicle collision prevention system may include a focal length controller that controls an irradiation angle of each of a first light source and a second light source such that rays emitted from the first light source overlaps rays emitted from the second light source at a predetermined collision distance, a camera that provides a shape, which is displayed when the rays emitted from the first light source and the second light source irradiate an object, as image data, an image processing device that generates braking information based on the image data, and a braking device that decreases a speed of a vehicle or to stop the vehicle based on the braking information.

According to an aspect of the present disclosure, a collision prevention method may include a light source operating step of emitting rays from a first light source and a second light source by operating the first light source positioned on a front left side of a vehicle and the second light source positioned on a front right side of the vehicle, a camera image monitoring step of obtaining a shape, which is displayed when the rays emitted from the first light source and the second light source irradiate an object in front of the vehicle, from a camera, a first collision distance determining step of determining whether the rays emitted from the first light source and the second light source overlap each other on the object, based on image data obtained from the camera in the camera image monitoring step, a second collision distance determining step of determining whether phases of the rays emitted from the first light source and the second light source are opposite to each other on the object, based on the image data after the first collision distance determining step, and a collision prevention controlling step of braking the vehicle when the rays emitted from the first light source and the second light source overlap each other on the object in the first collision distance determining step, or the phases of the rays emitted from the first light source and the second light source are not opposite to each other on the object in the second collision distance determining step.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE INVENTION

Hereinafter, embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 6.

Figure 1:
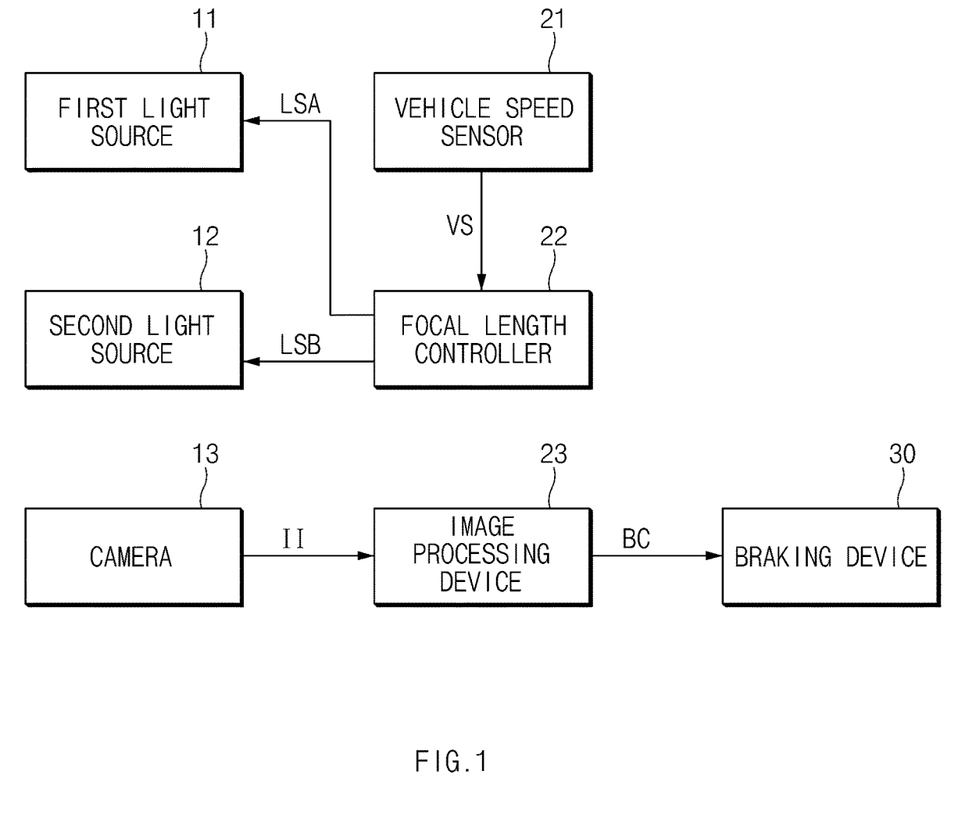
FIG. 1 is a view illustrating a configuration of a vehicle collision prevention system, according to an embodiment of the present disclosure.

FIG. 1 is a view illustrating a configuration of a vehicle collision prevention system, according to an embodiment of the present disclosure.

Referring to FIG. 1, according to an embodiment of the present disclosure, a focal length controller 22 and an image processing device 23 may be implemented inside a vehicle. At this time, the focal length controller 22 and the image processing device 23 may be integrally formed with internal control units of the vehicle, and may be implemented as a separate apparatus so as to be connected to the control units of a vehicle by a separate connection means.

Referring to FIG. 1, a vehicle collision prevention system according to an embodiment of the present disclosure may include a first light source 11, a second light source 12, a camera 13, a vehicle speed sensor 21, the focal length controller 22, the image processing device 23, and a braking device 30.

Each of the first and second light sources 11 and 12 may emit light at a predetermined irradiation angle.

For example, the first and second light sources 11 and 12 may emit light at the predetermined irradiation angle such that rays emitted at a predetermined focal length overlap each other.

At this time, the first light source 11 may be configured to change the predetermined irradiation angle based on first focal length control information LSA. The second light source 12 may be configured to change the predetermined irradiation angle based on second focal length control information LSB.

In addition, the first light source 11 may be configured to have a shape different from a shape displayed when light emitted from the second light source 12 irradiates an object.

Each of the first and second light sources 11 and 12 may be implemented with a light source emitting one of laser, LED light, and an infrared ray. However, according to an embodiment of the present disclosure, a vehicle collision prevention system and a collision prevention method using the same will be described through a configuration that emits infrared rays, but not limited thereto.

Hereinafter, each of the first and second light sources 11 and 12 will be described as an infrared light source emitting infrared rays.

The camera 13 may provide image data II by obtaining an image around a vehicle.

At this time, the camera 13 included in the collision prevention system according to an embodiment of the present disclosure may provide an infrared shape, which is formed on an object when the infrared rays emitted from the first and second light sources 11 and 12 irradiate an object, as the image data II.

The vehicle speed sensor 21 may generate vehicle speed information VS by detecting the speed of the vehicle, and may provide the generated vehicle speed information VS.

The focal length controller 22 may generate the first and second focal length control information LSA and LSB based on the vehicle speed information VS provided from the vehicle speed sensor 21, and may provide the first light source 11 and the second light source 12 with the generated first focal length control information LSA and the generated second focal length control information LSB, respectively.

The focal length controller 22 may respectively provide the first and second focal length control information LSA and LSB to the first and second light sources 11 and 12 and may control the infrared irradiation angle of each of the first and second light sources 11 and 12. Accordingly, the focal length controller 22 may change a distance (i.e., a focal length) between a vehicle and a focal point at which the infrared rays emitted from the first and second light sources 11 and 12 overlap with each other.

For example, as the vehicle speed increases based on the vehicle speed information VS provided from the vehicle speed sensor 21, the focal length controller 22 may increase the focal length by increasing the irradiation angle of each of the first and second light sources 11 and 12.

In the meantime, as the vehicle speed decreases based on the vehicle speed information VS provided from the vehicle speed sensor 21, the focal length controller 22 may decrease the focal length by decreasing the irradiation angle of each of the first and second light sources 11 and 12.

The image processing device 23 may generate braking information BC based on the image data II provided by the camera 13 and may provide the generated braking information BC to the braking device 30.

For example, the image processing device 23 may read a shape, which is displayed when infrared rays emitted from the first and second light sources 11 and 12 irradiate an object, based on the image data II provided by the camera 13, may generate the braking information BC depending on the read results, and may provide the generated braking information BC to the braking device 30.

In more detail, the image processing device 23 may read the shape, which is displayed when infrared rays emitted from the first and second light sources 11 and 12 irradiate an object, based on the image data II provided by the camera 13. When it is determined that a distance between the vehicle and the object is less than a focal length, the image processing device 23 may generate the braking information BC indicating an operation of the braking device 30 and then may provide the braking device 30 with the braking information BC.

In the meantime, the image processing device 23 may read the shape, which is displayed when infrared rays emitted from the first and second light sources 11 and 12 irradiate an object, based on the image data II provided by the camera 13. When the read result indicates that the distance between the vehicle and the object exceeds the focal length, the image processing device 23 may block the generation of the braking information BC indicating the operation of the braking device 30.

The braking device 30 may perform a braking operation of reducing the vehicle's speed or stopping the vehicle, based on the braking information BC provided from the image processing device 23.

Figure 2:
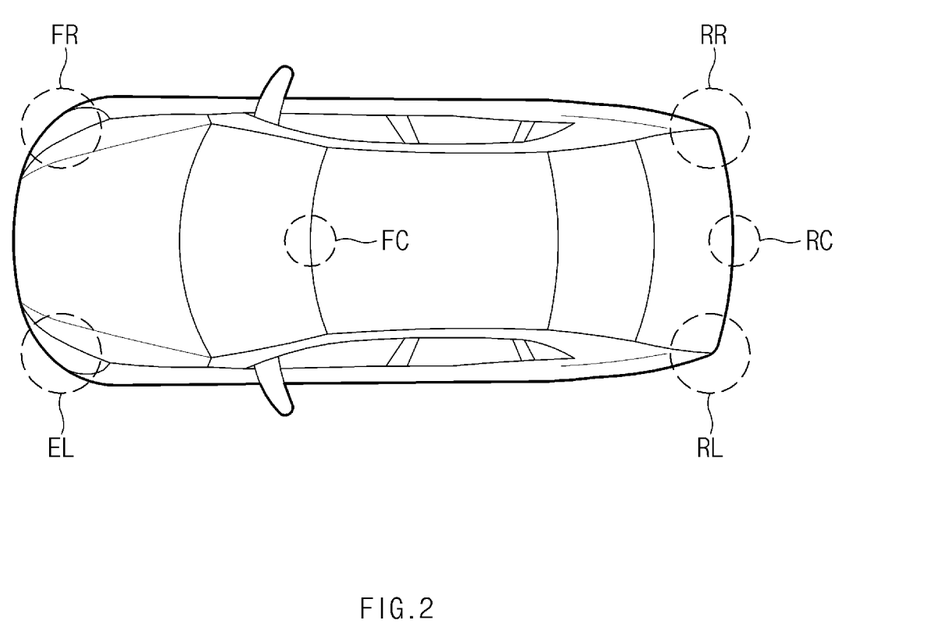
FIG. 2 is a view illustrating locations of light sources and a camera included in a vehicle collision prevention system, according to an embodiment of the present disclosure.

FIG. 2 is a view illustrating locations of light sources and a camera included in a vehicle collision prevention system, according to an embodiment of the present disclosure.

A vehicle collision prevention system according to an embodiment of the present disclosure may include the first light source 11 disposed at a front left FL of a vehicle, the second light source 12 disposed at a front right FR of the vehicle, and the camera 13 disposed at a front center FC of the vehicle.

In the meantime, the vehicle collision prevention system according to another embodiment of the present disclosure may include the first light source 11 disposed at a rear left RL of the vehicle, the second light source 12 disposed at a rear right RR of the vehicle, and the camera 13 disposed at a rear center RC of the vehicle.

The vehicle collision prevention system according to an embodiment of the present disclosure or according to another embodiment of the present disclosure is just an example that the two light sources 11 and 12 and the one camera 13 are positioned in front or rear of a vehicle. The vehicle collision prevention system according to another embodiment of the present disclosure may include four light sources, which are respectively positioned on a front left side, a front right side, a rear left side, and a rear right side of the vehicle, and two cameras respectively positioned on front and rear centers of the vehicle.

The vehicle collision prevention system according to an embodiment of the present disclosure discloses only a minimum configuration (two light sources and one camera) for implementing the object and effect of the present disclosure, but not limited thereto.

Hereinafter, it will be described that the first and second light sources 11 and 12 are respectively positioned on the front left and front right sides of the vehicle, and the camera 13 is positioned in the front center of the vehicle, in the collision prevention system according to an embodiment of the present disclosure.

FIGS. 3A to 5B are views for describing an operation of a vehicle collision prevention system, according to an embodiment of the present disclosure.

Figure 3A:
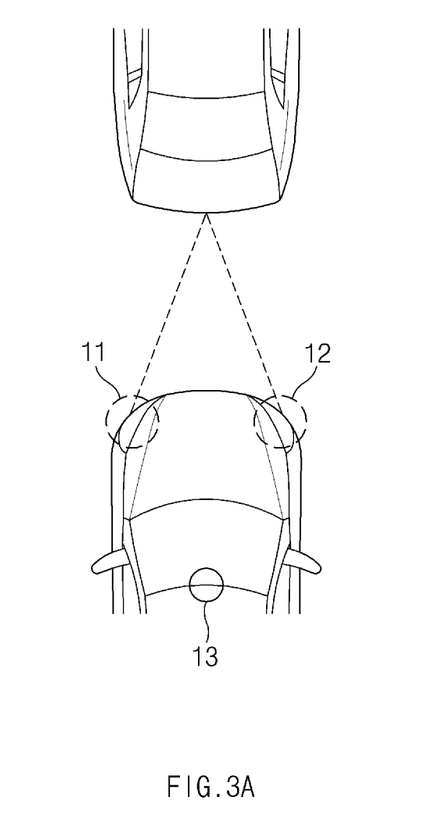
FIGS. 3A, 3B, 3C, 4A, 4B, 4C, 5A and 5B are views for describing an operation of a vehicle collision prevention system, according to an embodiment of the present disclosure.
Figure 3B:
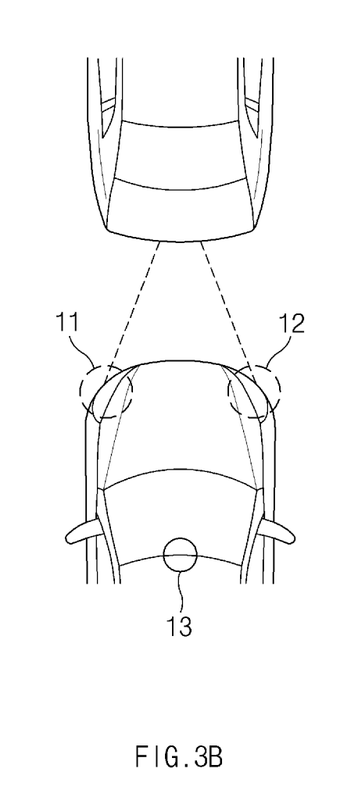
Figure 3C:
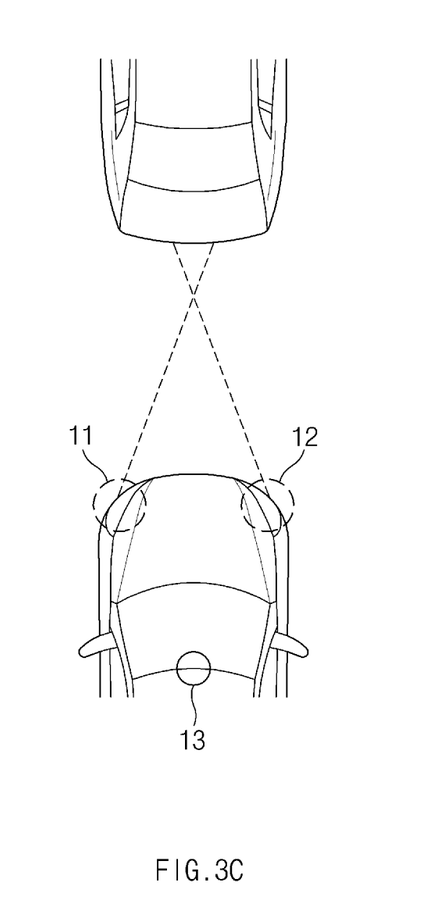

FIGS. 3A to 3C illustrates a shape displayed when the infrared rays emitted from the first and second light sources 11 and 12 irradiate the rear of a preceding vehicle depending on a distance between a host vehicle and the preceding vehicle in a state where the vehicle collision prevention system according to an embodiment of the present disclosure is configured such that infrared rays emitted from the first and second light sources 11 and 12 positioned on a host vehicle overlap each other at a predetermined focal length.

FIG. 3A shows a case that a distance between the host vehicle and the preceding vehicle matches a predetermined focal length, in a state where infrared rays emitted from the first and second light sources 11 and 12 positioned in the host vehicle are set to overlap each other at a predetermined focal distance.

At this time, the focal point of the infrared rays emitted from the host vehicle appears behind the preceding vehicle.

FIG. 3B shows a case that the distance between the host vehicle and the preceding vehicle is shorter than the predetermined focal length, in a state where infrared rays emitted from the first and second light sources 11 and 12 positioned in the host vehicle are set to overlap each other at the predetermined focal distance.

At this time, the infrared rays emitted from the first light source 11 of the host vehicle may be displayed on the rear left side of the preceding vehicle. The infrared rays emitted from the second light source 12 of the host vehicle may be displayed on the rear right side of the preceding vehicle.

FIG. 3C shows a case that the distance between the host vehicle and the preceding vehicle is longer than the predetermined focal length, in a state where infrared rays emitted from the first and second light sources 11 and 12 positioned in the host vehicle are set to overlap each other at the predetermined focal distance.

At this time, the infrared rays emitted from the first light source 11 of the host vehicle may be displayed on the rear right side of the preceding vehicle. The infrared rays emitted from the second light source 12 of the host vehicle may be displayed on the rear left side of the preceding vehicle.

When the distance between the host vehicle and the preceding vehicle is within a predetermined focal length, the vehicle collision prevention system according to an embodiment of the present disclosure may generate the braking information BC and then may provide the braking device 30 with the braking information BC. Accordingly, the vehicle collision prevention system according to an embodiment of the present disclosure may prevent the collision between the host vehicle and the preceding vehicle.

That is, in cases of FIGS. 3A and 3B, the vehicle collision prevention system according to an embodiment of the present disclosure may generate the braking information BC through a camera positioned in the front center of the vehicle and then may provide the braking device 30 with the braking information BC. Accordingly, the vehicle collision prevention system according to an embodiment of the present disclosure may prevent the collision between the host vehicle and the preceding vehicle.

The cases of FIGS. 3A to 3C will be described in more detail with reference to FIGS. 4A to 4C as follows.

As described above, the first light source 11 may be configured to have a shape different from a shape displayed when the infrared rays emitted from the second light source 12 irradiate an object.

At this time, a shape displayed when the infrared rays emitted from the first light source 11 positioned on the front left side of the host vehicle irradiate a subject (the rear of the preceding vehicle) may be a shape of "-". A shape displayed when the infrared rays emitted from the second light source 12 positioned on the front right side of the host vehicle irradiate the subject (the rear of the preceding vehicle) may be a shape of "|".

Figure 4A:
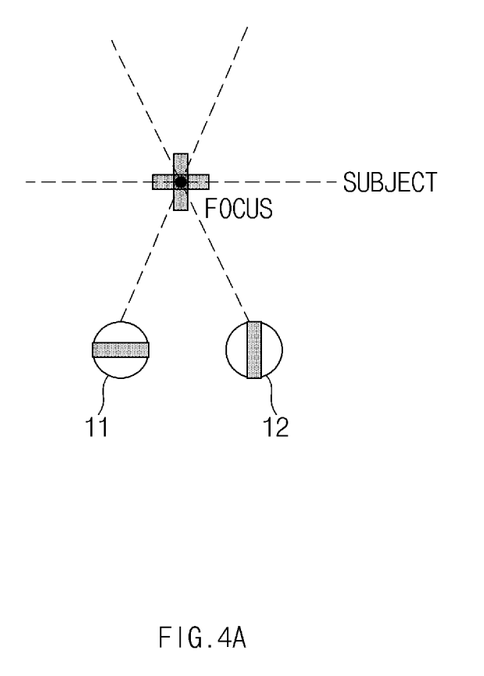

As illustrated in FIG. 3A, when the distance between the host vehicle and the preceding vehicle matches the focal length between the first and second light sources 11 and 12, a shape of "+" may be displayed on the rear (subject) of the preceding vehicle as illustrated in FIG. 4A.

Figure 4B:
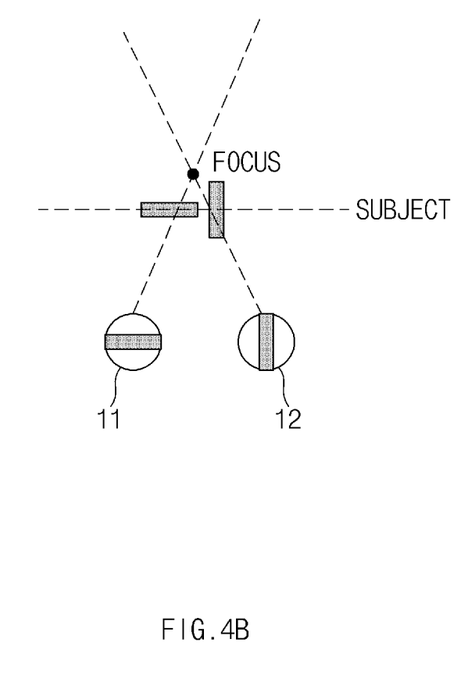

When the distance between the host vehicle and the preceding vehicle is within the focal length between the first and second light sources 11 and 12 as illustrated in FIG. 3B, as illustrated in FIG. 4B, the infrared rays emitted from the first light source 11 positioned on the front left side of the host vehicle may be displayed as a shape of "-" on the left side of the rear (subject) of the preceding vehicle, and the infrared rays emitted from the second light source 12 positioned on the front right side of the host vehicle may be displayed as a shape of "|" on the right side of the rear (subject) side of the preceding vehicle.

Figure 4C:
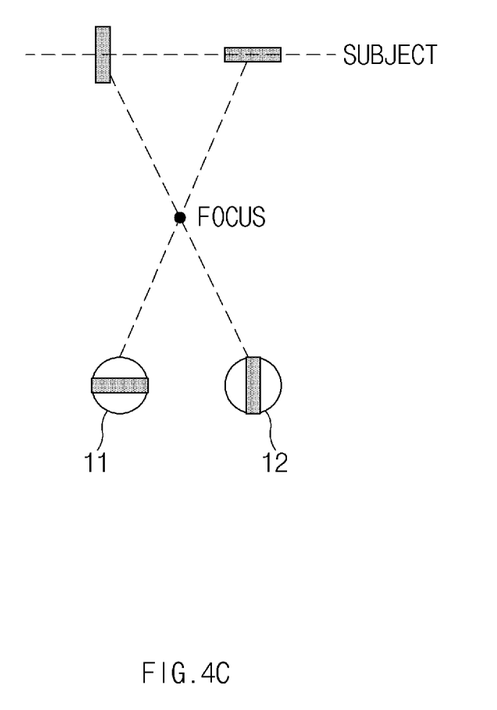

When the distance between the host vehicle and the preceding vehicle is longer than the focal length between the first and second light sources 11 and 12 as illustrated in FIG. 3C, as illustrated in FIG. 4C, the infrared rays emitted from the first light source 11 positioned on the front left side of the host vehicle may be displayed as a shape of "-" on the right side of the rear (subject) of the preceding vehicle, and the infrared rays emitted from the second light source 12 positioned on the front right side of the host vehicle may be displayed as a shape of "|" on the left side of the rear (subject) side of the preceding vehicle.

Accordingly, the collision prevention system according to an embodiment of the present disclosure may determine whether or not the distance between the host vehicle and the preceding vehicle is not greater than a predetermined focal length, by processing a shape of the infrared rays displayed on the rear of the preceding vehicle based on image data obtained from the camera 13 positioned in the front center of the host vehicle.

At this time, the collision prevention system according to an embodiment of the present disclosure may recognize that the focal length between a pair of light sources is a collision prevention distance. When the distance between the host vehicle and an object in front of the host vehicle is not greater than the collision prevention distance, the collision prevention system according to an embodiment of the present disclosure may generate the braking information BC and may provide the braking device 30 with the braking information BC, thereby preventing the collision between the host vehicle and the object existing in front of the host vehicle.

Figure 5A:
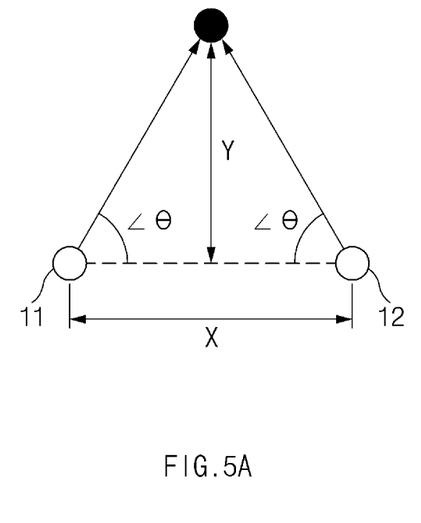
Figure 5B:
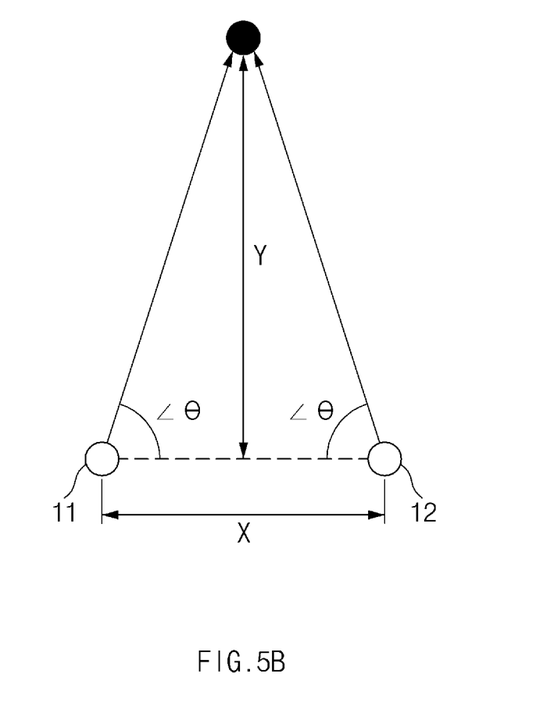

FIG. 5 is a view for describing an operation of a vehicle collision prevention system according to an embodiment of the present disclosure that calculates a focal length between the first light source 11 positioned on the front left FL of the vehicle and the second light source 12 positioned on the front right FR of the vehicle.

At this time, as shown in FIG. 5, the infrared ray emission direction may be determined such that infrared rays emitted from the first and second light sources 11 and 12 overlap each other at one focal point. The first and second light sources 11 and 12 may emit infrared rays with the same irradiation angle ($\angle\theta$).

Furthermore, it may be assumed that a distance between the first and second light sources 11 and 12 is X. It may be assumed that a distance from the center of the distance between the first and second light sources 11 and 12 to a focal point is Y.

The camera 13 may be positioned at the center of the distance between the first and second light sources 11 and 12.

An isosceles triangle having the first light source 11, the second light source 12, and the focal point as vertexes may be formed.

Accordingly, line Y indicating a distance from the focal point to the center between the first and second light sources 11 and 12 is orthogonal to line X. At this time, the first and second light sources 11 and 12 may be positioned on the front left FL and the front right FR of the vehicle, and thus the distance between the first and second light sources 11 and 12 may be a determined value.

"tan $\theta$" may be expressed as "Y/(X/2)". In summary, "Y" may be expressed as "tan $\theta$*X/2".

As a result, the distance (i.e., a focal length Y) between the focal point and the host vehicle is expressed as "Y=tan ƒ*X/2". Accordingly, "Y" may be calculated when value $\theta$ and value X are determined. At this time, "$\theta$" may be the irradiation angle of each of the first and second light sources 11 and 12, and "X" may be a fixed distance between the first and second light sources 11 and 12 positioned on the front left and right sides of the vehicle. Accordingly, the focal length (Y) may be calculated depending on the irradiation angle ($\angle\theta$) of each of the first and second light sources 11 and 12, and the focal length (Y) may be also varied.

The focal length controller 22 of FIG. 1 may change a distance (i.e., a focal length (or a collision distance)) between the vehicle and the focal point at which infrared rays emitted from the first and second light sources 11 and 12 overlap each other, by controlling the irradiation angle of each of the first and second light sources 11 and 12 based on the vehicle speed information VS provided from the vehicle speed sensor 21.

At this time, when the vehicle speed increases based on the vehicle speed information VS, the focal length controller 22 may increase the focal length (or a collision distance) by increasing the irradiation angle. When the vehicle speed decreases based on the vehicle speed information VS, the focal length controller 22 may decrease the focal length (or a collision distance) by decreasing the irradiation angle.

The vehicle collision prevention system according to an embodiment of the present disclosure may recognize a shape displayed when infrared rays emitted from a pair of light sources positioned on the left and right sides of the vehicle irradiate an object, through a camera. When it is determined that the distance between the host vehicle and the object is within the collision distance, the vehicle collision prevention system may prevent the collision between the host vehicle and objects by operating a braking device.

Figure 6:
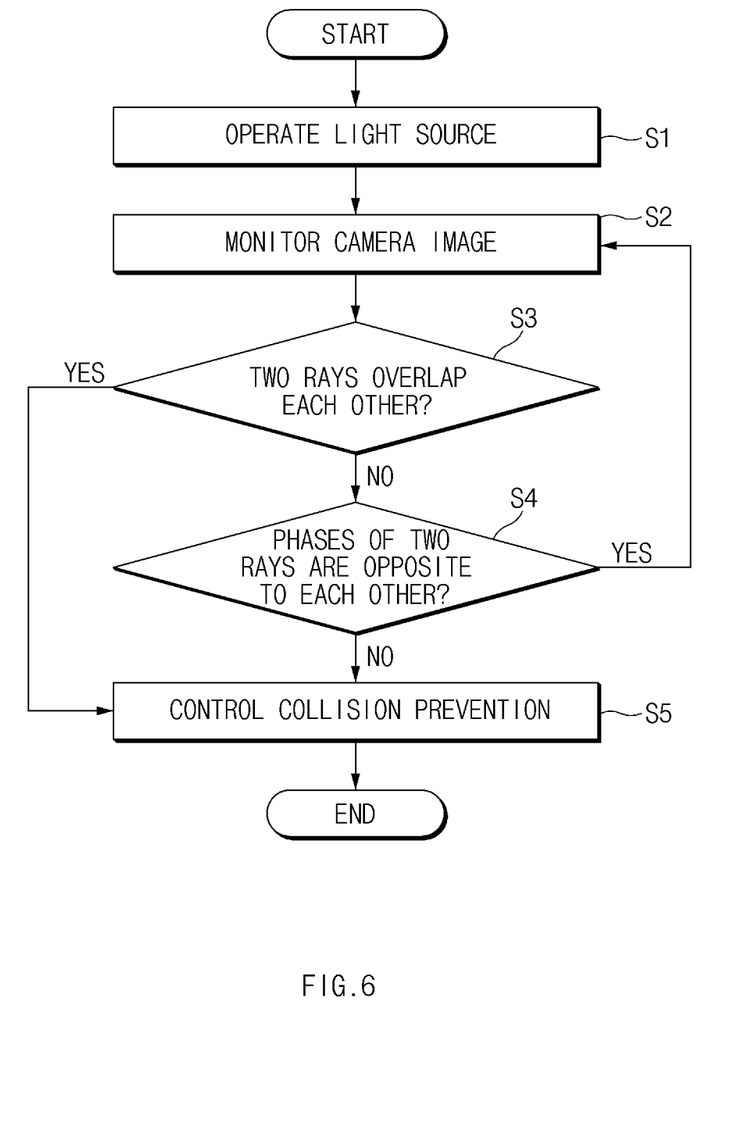
FIG. 6 is a view illustrating a flowchart for describing a collision prevention method by using a vehicle collision prevention system, according to an embodiment of the present disclosure.

FIG. 6 is a view illustrating a flowchart for describing a collision prevention method by using a vehicle collision prevention system, according to an embodiment of the present disclosure.

A collision prevention method using a vehicle collision prevention system according to an embodiment of the present disclosure will be described with reference to FIG. 6.

Referring to FIG. 6, the collision prevention method according to an embodiment of the present disclosure may include a light source operating step (S1), a camera image monitoring step (S2), a first collision distance determining step (S3), a second collision distance determining step (S4), and a collision prevention controlling step (S5).

The light source operating step (S1) may include a step of emitting light (e.g., infrared rays) from the first and second light sources 11 and 12 by operating the first and second light sources 11 and 12 positioned on the front left FL and front right FR of the vehicle.

The following description assumes that the light emitted from the first and second light sources 11 and 12 is infrared rays.

The camera image monitoring step (S2) may include obtaining a shape, which is displayed when infrared rays emitted from the first and second light sources 11 and 12 irradiate an object (e.g. a preceding vehicle) in front of the vehicle, from the camera 13.

The first collision distance determining step (S3) may include determining whether a distance between a vehicle and an object (e.g. a preceding vehicle) in front of the vehicle from a shape displayed when infrared rays emitted from the first and second light sources 11 and 12 irradiate the object in front of the vehicle is a collision distance, based on the image data II obtained from the camera 13.

When the infrared rays emitted from the first and second light sources 11 and 12 overlap each other on the object (Yes) in the first collision distance determining step (S3), the collision prevention control step (S5) may be performed.

At this time, the first collision distance determining step (S3) may be a step in which the image processing device 23 receives a shape in which infrared rays overlap each other and which is the same shape as illustrated in FIG. 4A, from the camera 13 as the image data II, reads the image data II, and determines that a distance between a host vehicle and an object in front of the host vehicle is a collision distance.

In the meantime, when the infrared rays emitted from the first and second light sources 11 and 12 do not overlap each other on the object (No) in the first collision distance determining step (S3), the second collision distance determining step (S4) may be performed.

The second collision distance determining step (S4) may include determining whether a distance between a vehicle and an object (e.g. a preceding vehicle) in front of the vehicle from a shape displayed when infrared rays emitted from the first and second light sources 11 and 12 irradiate the object in front of the vehicle is longer than a collision distance, based on the image data II obtained from the camera 13.

When phases of the infrared rays emitted from the first and second light sources 11 and 12 are opposite to each other on the object (Yes) in the second collision distance determining step (S4), the camera image monitoring step (S2) may be performed.

At this time, the second collision distance determining step (S4) may be a step of determining that a distance between a vehicle and an object in front of the vehicle is longer than the collision distance when the phases of the infrared rays emitted from the first and second light sources 11 and 12 are opposite to each other on the object (i.e., as illustrated in FIG. 4C, when the infrared rays emitted from the first light source 11 positioned on a left side are displayed on a right side of the object rather than the infrared rays emitted from the second light source 12 and the infrared ray emitted from the second light source 12 positioned on a right side are displayed on a left side of the object rather than the infrared rays emitted from the first light source 11).

As a result, when it is determined in the second collision distance determining step (S4) that a distance between a vehicle and an object in front of the vehicle is longer than the collision distance, the camera image monitoring step (S2) of monitoring a shape displayed when the infrared rays emitted from the first and second light sources 11 and 12 irradiate the object may be performed again.

In the meantime, when the phases of the infrared rays emitted from the first and second light sources 11 and 12 are not opposite to each other on the object (No) in the second collision distance determining step (S4), the collision prevention controlling step (S5) may be performed.

At this time, the second collision distance determining step (S4) may be a step of determining that the distance between a vehicle and an object in front of the vehicle is shorter than the collision distance when the phases of the infrared rays emitted from the first and second light sources 11 and 12 are not opposite to each other on the object (i.e., as illustrated in FIG. 4B, when the infrared rays emitted from the first light source 11 positioned on a left side are displayed on a left side of the object, and the infrared rays emitted from the second light source 12 positioned on a right side are displayed on a right side of the object).

As a result, when it is determined in the second collision distance determining step (S4) that the distance between a vehicle and an object in front of the vehicle is shorter than the collision distance, the collision prevention controlling step (S5) may be performed.

When, in the first collision distance determination step (S3), it is determined that the distance between a vehicle and an object in front of the vehicle is the collision distance, or it is determined that the distance between a vehicle and an object in front of the vehicle is shorter than the collision distance, the collision prevention controlling step (S5) may include generating the braking information BC and providing the braking information BC to the braking device 30.

As such, a vehicle collision prevention system and a collision prevention method using the same according to an embodiment of the present disclosure may operate a braking device when a distance between a vehicle and an object is within the collision distance, by obtaining a shape, which is displayed when infrared rays emitted from a pair of light sources installed on the left and right sides of the vehicle irradiate the object around the vehicle, from a camera and processing the shape. Accordingly, a vehicle collision prevention system and a collision prevention method using the same according to an embodiment of the present disclosure may improve the stability of vehicle driving.

Moreover, it is determined that a distance between a vehicle and an object is a collision distance, based on a shape displayed when infrared rays emitted from a pair of light sources irradiate the object. Accordingly, the vehicle collision prevention system and the collision prevention method using the same according to an embodiment of the present disclosure may be implemented by using a relatively simple algorithm or configuration.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present technology may easily recognize the possibility of collision with the help of existing sensors, thereby improving driving safety.

Moreover, the present technology may intuitively determine the possibility of collision by monitoring only a location of a shape displayed when light emits an object, thereby simply detecting dangerous situations.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle collision prevention system, the system comprising:
    a first light source positioned on a left side of a vehicle and configured to emit first rays;

a second light source positioned on a right side of the vehicle and configured to emit second rays;

a camera positioned at a center of the vehicle and configured to capture a shape of the first and second rays irradiated on an object, and output the captured shape as image data;

an image processing device configured to generate braking information based on the image data; and a braking device configured to perform, based on the braking information, decreasing speed of the vehicle or stopping the vehicle, wherein:

the first and second rays are emitted to overlap with each other at one focal point, a first shape of the first rays irradiated on the object is different from a second shape of the second rays irradiated on the object, the image processing device is configured to generate the braking information when the image data indicates that the first and second rays overlap with each other on the object, the image processing device is further configured to generate the braking information when the image data indicates that the first rays are displayed on a left side of the object and the second rays are displayed on a right side of the object, and the image processing device is further configured not to generate the braking information when the image data indicates that the first rays are displayed on a right side of the object and the second rays are displayed on a left side of the object.

2. The system of claim 1, further comprising:

a vehicle speed sensor configured to sense a vehicle speed and generate vehicle speed information based on the sensed vehicle speed; and a focal length controller configured to change an irradiation angle of the first and second light sources based on the vehicle speed information.

3. The system of claim 2, wherein the focal length controller is further configured to:

increase the irradiation angle of the first and second light sources when the vehicle speed information indicates that the vehicle speed increases, and decrease the irradiation angle of the first and second light sources when the vehicle speed information indicates that the vehicle speed decreases.

4. The system of claim 1, wherein the first shape is a first line having a first orientation relative to the vehicle and the second shape is a second line having a second orientation, different than the first orientation, relative to the vehicle.

5. The system of claim 4, wherein the first orientation is a horizontal orientation relative to the vehicle and the second orientation is a vertical orientation relative to the vehicle.

* * * * *